No. 682,773. Patented Sept. 17, 1901.
W. J. WHITE.
PNEUMATICALLY PROPELLED VEHICLE.
(Application filed Apr. 5, 1899.)
(No Model.)
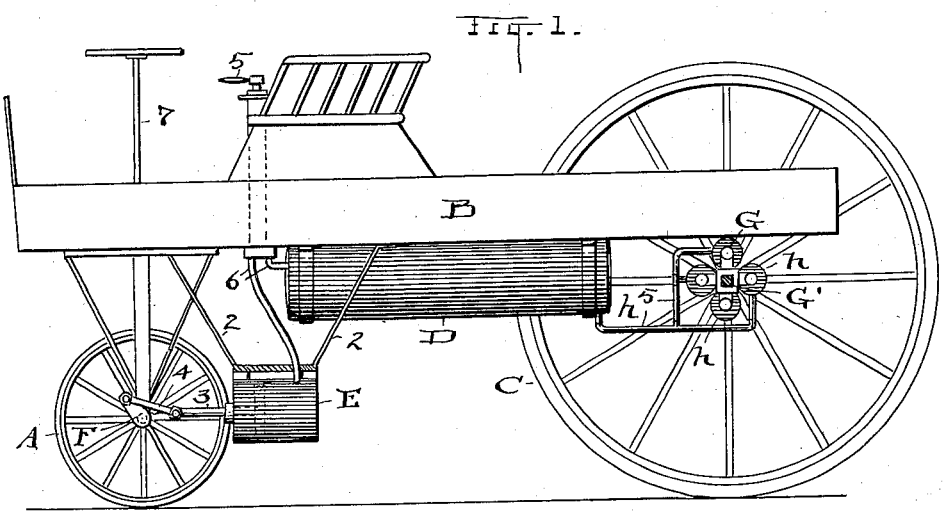
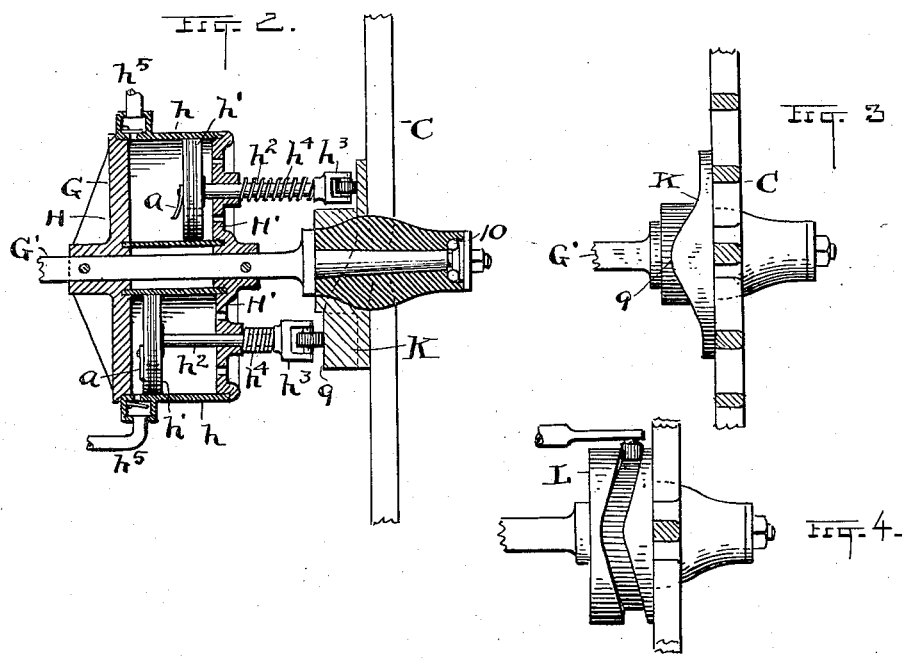
ATTEST
INVENTOR.
WILLIAM J. WHITE
BY
ATTY

UNITED STATES PATENT OFFICE.

WILLIAM J. WHITE, OF CLEVELAND, OHIO.

PNEUMATICALLY-PROPELLED VEHICLE.

SPECIFICATION forming part of Letters Patent No. 682,773, dated September 17, 1901.

Application filed April 5, 1899. Serial No. 711,815. (No model.)

*To all whom it may concern:*

Be it known that I, WILLIAM J. WHITE, a citizen of the United States, residing at Cleveland, in the county of Cuyahoga and State of Ohio, have invented certain new and useful Improvements in Pneumatically-Propelled Vehicles; and I do declare that the following is a full, clear, and exact description of the invention, which will enable others skilled in the art to which it appertains to make and use the same.

My invention relates to pneumatically-propelled vehicles, and is but another embodiment of the invention shown and described in my concurrent application, Serial No. 711,814, in which the invention is set forth in all its broader aspects, and hence is the dominating application. The same principle obtains in this case as in that of a vehicle carrying with it in some convenient position a tank or tanks for compressed air and one or more motors for utilizing the air in the driving of the vehicle, a set of small traction-wheels being employed for this purpose, while at the rear are much larger wheels and pumps to keep up the supply of air having their operating connections near the axial line of the rear wheels, so as to operate the pumps with a mere nominal outlay of energy.

Having reference now to the drawings, Figure 1 is a side elevation of a vehicle carrying my improvements. Fig. 2 is an enlarged sectional elevation of a set of pumps and their operating connections with one of the vehicle-wheels. Fig. 3 is a sectional elevation of a pump-driving wheel and designed to show the cam on its inner side. Fig. 4 is a modification of the cam.

A represents the front drive or traction wheels, B the body, and C the rear wheels.

D is the air-storage tank, E the motor-cylinder, of which there may be one or more, and F the crank-axle, which turns with the front wheels, or rather serves to turn said wheels through the power of the motor. The motor is suspended from the body B by rods 2 and has a piston-rod 3 and connecting-rod 4, engaging with the crank on shaft F. A lever or the like 5 in front of the operator serves to control the passage of the air through tubes 6 between tank and motor-vehicle, and any suitable means of guiding or steering the vehicle may be employed, an ordinary handwheel and rod 7 being shown here. At the rear I have arranged a series of pumps G in a group of four about the axle G', and in this instance comparatively near to one of the rear wheels C. These pumps are shown here as having a common base H and a common head H', sleeved on shaft G, and each has its own body $h$ secured between base and head. Obviously any other practical way of building up these pumps may be adopted and not depart from the invention, and one or more may be used at pleasure, or some may be cut out and one or more used at a time. Each pump has a piston $h'$ with an ordinary flip-valve $a$, as here shown, to let air into the cylinder, and a rod $h^2$, passing through head $h'$ and having a fixed bearing therein confining the rod to linear movements. On the outer end of the rod is a head $h^3$ with a wheel or roller, and between the said head and the casing H' there is a coiled spring $h^4$ about the rod arranged to keep it normally out in contact with the cam K for operating the pumps. The said cam K has a hub of its own sleeved on the hub of wheel C and is of such depth as to cause the pistons to traverse the full length of their cylinders, thus giving all the requisite stroke for effective work. The highest point of the cam is seen at 9, Figs. 2 and 3, and all the pumps are operated once in each complete revolution of wheel C.

I might construct a double cam instead of a single one, and so also might I modify the invention shown in other particulars; but the principle would not be changed, inasmuch as I have planned by this construction to operate the pumps in a position at right angles to the direction of travel, and where the power is taken off as near as practical to the immediate axis of the wheel, thus enabling the wheel to do a large amount of hard work in the volume of air stored without incurring any hurtful burden or being materially hampered in its movements. Then as a further precaution to keep down friction and promote easy rotation I place antifriction-balls 10 about the outer end of the spindle to take the endwise thrust of the hub, thus bringing all resistance to the rotation of wheel C on account of the pumps down to a point where it is scarcely appreciable in the movements of the vehicle.

In the modification, Fig. 4, I dispense with the springs $h^4$ and provide a positive action both ways for the piston-rods by using a cam L with a flanged channel or groove and the rollers on the said rod run in the same, as shown. With such a construction I might pump in both directions of travel, and of course can arrange the pumps in connection with one or both rear wheels. The compressed air goes from the pumps by pipes or tubes $h^5$, Fig. 2, to the storage-tank.

Any suitable primary charge or means of charging the storage-tank may be employed; but such means do not constitute a part of this invention.

What I claim is—

1. A vehicle and a pneumatic chamber and motor thereon to drive the vehicle, in combination with an air-replenishing mechanism comprising a pump set to operate at right angles to the direction of travel and means connected with a revolving part of the vehicle to operate said pump, substantially as described.

2. A vehicle having front and rear axles, a series of direct-acting pumps grouped about the rear axle and pistons and piston-rods parallel to the said axle, and a cam on one of the rear wheels to operate said pumps, substantially as described.

Witness my hand to the foregoing specification this 28th day of February, 1899.

WILLIAM J. WHITE.

Witnesses:
H. E. MUDRA,
R. B. MOSER.